(12) United States Patent
Park et al.

(10) Patent No.: US 11,356,212 B2
(45) Date of Patent: Jun. 7, 2022

(54) METHOD AND APPARATUS FOR TRANSMITTING AND RECEIVING SIDELINK HARQ FEEDBACK INFORMATION

(71) Applicant: KT CORPORATION, Gyeonggi-do (KR)

(72) Inventors: Ki-Hyeon Park, Seoul (KR); Ki-tae Kim, Seoul (KR); Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 49 days.

(21) Appl. No.: 16/839,472

(22) Filed: Apr. 3, 2020

(65) Prior Publication Data

US 2020/0322099 A1 Oct. 8, 2020

(30) Foreign Application Priority Data

Apr. 5, 2019 (KR) .................. 10-2019-0039934
Mar. 6, 2020 (KR) .................. 10-2020-0028373

(51) Int. Cl.
*H04L 1/18* (2006.01)
*H04W 72/04* (2009.01)

(52) U.S. Cl.
CPC ....... *H04L 1/1861* (2013.01); *H04W 72/0406* (2013.01)

(58) Field of Classification Search
CPC ... H04W 28/04; H04W 72/04; H04W 72/042; H04W 88/08; H04W 72/0406; H04L 5/0007; H04L 1/1861

USPC ......................................................... 370/329
See application file for complete search history.

(56) References Cited

U.S. PATENT DOCUMENTS

| 10,785,753 | B1* | 9/2020 | Li ................. H04L 1/1887 |
| 2016/0353478 | A1 | 12/2016 | Kim | |
| 2017/0257876 | A1 | 9/2017 | Loehr et al. | |
| 2018/0263026 | A1 | 9/2018 | Loehr et al. | |
| 2019/0116565 | A1* | 4/2019 | Chae ............... H04W 24/10 |
| 2019/0174530 | A1* | 6/2019 | Kim ................ H04L 1/0025 |
| 2019/0334664 | A1* | 10/2019 | Guan .............. H04L 5/0055 |

(Continued)

FOREIGN PATENT DOCUMENTS

| KR | 10-2016-0105832 A | 9/2016 | |
| KR | 20160105832 A * | 10/2016 | ........... H04W 72/12 |

(Continued)

*Primary Examiner* — Peter G Solinsky
*Assistant Examiner* — Sanjay K Dewan
(74) *Attorney, Agent, or Firm* — Invenstone Patent, LLC

(57) ABSTRACT

Provided are methods and apparatuses for transmitting and/or receiving sidelink HARQ feedback information. Further, a method of a user equipment (UE) may be provided for transmitting HARQ feedback information in response to sidelink transmission. The method may include: receiving configuration information for a resource pool for the sidelink transmission, receiving configuration information on frequency resources for transmission of a physical sidelink feedback channel (PSFCH) in the resource pool, and transmitting HARQ feedback information in response to a physical sidelink shared channel (PSSCH) received from one or more other UE(s) using a PSFCH resource determined based on the configuration information for frequency resources in the resource pool.

15 Claims, 20 Drawing Sheets

(56) References Cited

U.S. PATENT DOCUMENTS

| | | | |
|---|---|---|---|
| 2019/0342895 A1 | 11/2019 | Loehr et al. | |
| 2020/0029318 A1* | 1/2020 | Guo | H04W 4/40 |
| 2020/0092692 A1* | 3/2020 | Wang | H04W 4/40 |
| 2020/0196255 A1* | 6/2020 | Cheng | H04L 5/0033 |
| 2020/0205165 A1* | 6/2020 | Huang | H04W 76/14 |
| 2020/0235868 A1* | 7/2020 | Yu | H04L 5/0055 |
| 2020/0266857 A1* | 8/2020 | Hwang | H04B 7/0417 |
| 2020/0280398 A1* | 9/2020 | Hwang | H04L 1/1861 |
| 2020/0305176 A1* | 9/2020 | Hu | H04B 7/0456 |
| 2020/0314940 A1* | 10/2020 | Park | H04W 76/18 |
| 2020/0344722 A1* | 10/2020 | He | H04W 72/0446 |
| 2020/0351032 A1* | 11/2020 | Wu | H04W 72/10 |
| 2020/0359368 A1 | 11/2020 | Loehr et al. | |
| 2020/0374978 A1* | 11/2020 | Panteleev | H04W 72/0406 |
| 2020/0396040 A1* | 12/2020 | Miao | H04L 5/0055 |
| 2021/0028891 A1* | 1/2021 | Zhou | H04L 1/1854 |
| 2021/0050954 A1* | 2/2021 | Ryu | H04W 72/02 |
| 2021/0099901 A1* | 4/2021 | Huang | H04W 24/10 |
| 2021/0105744 A1* | 4/2021 | Balasubramanian | H04W 76/14 |
| 2021/0136781 A1* | 5/2021 | Hosseini | H04W 72/0413 |
| 2021/0168790 A1* | 6/2021 | Li | H04L 1/1861 |
| 2021/0203453 A1* | 7/2021 | Kim | H04W 4/40 |
| 2021/0385804 A1* | 12/2021 | Ye | H04W 4/40 |

FOREIGN PATENT DOCUMENTS

| | | | | |
|---|---|---|---|---|
| KR | 10-2017-0110069 A | | 10/2017 | |
| KR | 20170110069 A | * | 10/2017 | H04W 72/10 |
| KR | 10-2018-0080199 A | | 7/2018 | |
| KR | 10-2018-0107995 A | | 10/2018 | |
| KR | 20180080199 A | * | 10/2018 | H04W 72/04 |
| KR | 20180107995 A | * | 10/2018 | H04L 5/00 |
| WO | WO-2020210333 A1 | * | 10/2020 | H04L 1/1861 |

* cited by examiner

METHOD AND APPARATUS FOR TRANSMITTING AND RECEIVING SIDELINK HARQ FEEDBACK INFORMATION

CROSS-REFERENCE TO RELATED APPLICATION

This application claims the priority benefit of Korean Patent Application No. 10-2019-0039934, filed on Apr. 5, 2019 and No. 10-2020-0028373, filed on Mar. 6, 2020 in the Korean Intellectual Property Office, the disclosures of which are incorporated herein by reference in their entirety.

BACKGROUND

1. Technical Field

The present disclosure relates to methods and apparatuses for transmitting and receiving sidelink HARQ feedback information in a next-generation/5G radio access network (hereinafter, referred to as a new radio, "NR").

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting any NR system.

To address such issues, a design is needed for configuring radio resources for transmitting HARQ ACK/NACK feedback information for transmission over sidelink that is a device-to-device radio link for providing a V2X service in the NR, that is, NR sidelink transmission.

SUMMARY

In accordance with embodiments of the present disclosure, methods and apparatuses are provided for configuring physical sidelink feedback channel (PSFCH) resources in a resource pool for sidelink transmission in order to transmit HARQ feedback information in response to the sidelink transmission, in the NR.

In accordance with one aspect of the present disclosure, a method of a user equipment ("UE") is provided for transmitting HARQ feedback information for sidelink transmission. The method may include: receiving configuration information for a resource pool for the sidelink transmission, receiving configuration information for frequency resources for transmission of a physical sidelink feedback channel (PSFCH) in the resource pool, and transmitting the HARQ feedback information in response to a physical sidelink shared channel (PSSCH) received from one or more other UE(s) through a PSFCH resource determined based on the configuration information for the frequency resources in the resource pool.

In accordance with another aspect of the present disclosure, a method of a base station is provided for controlling transmission of HARQ feedback information of a UE for sidelink transmission. The method may include: transmitting configuration information for a resource pool for the sidelink transmission, and transmitting configuration information for frequency resources for transmission of a physical sidelink feedback channel (PSFCH) in the resource pool, wherein the UE transmits the HARQ feedback information in response to a physical sidelink shared channel (PSSCH) received from one or more other UE(s) through a PSFCH resource determined based on the configuration information for the frequency resources in the resource pool.

In accordance with further another aspect of the present disclosure, a UE is provided for transmitting HARQ feedback information for sidelink transmission. The UE may include: a receiver receiving configuration information for a resource pool for the sidelink transmission and receiving configuration information for frequency resources for transmission of a physical sidelink feedback channel (PSFCH) in the resource pool, and a transmitter transmitting the HARQ feedback information in response to a physical sidelink shared channel (PSSCH) received from one or more other UE(s) through a PSFCH resource determined based on the configuration information for the frequency resources in the resource pool.

In accordance with yet another aspect of the present disclosure, a base station is provided for controlling transmission of HARQ feedback information of a UE for sidelink transmission. The base station may include a transmitter transmitting configuration information for a resource pool for the sidelink transmission and transmitting configuration information for frequency resources for transmission of a physical sidelink feedback channel (PSFCH) in the resource pool, wherein the UE transmits the HARQ feedback information in response to a physical sidelink shared channel (PSSCH) received from one or more other UE(s) through a PSFCH resource determined based on the configuration information for the frequency resources in the resource pool.

In accordance with embodiments of the present disclosure, it is possible to provide methods and apparatuses for configuring PSFCH resources in a resource pool for sidelink transmission in order to transmit HARQ feedback information for the sidelink transmission, in the NR.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
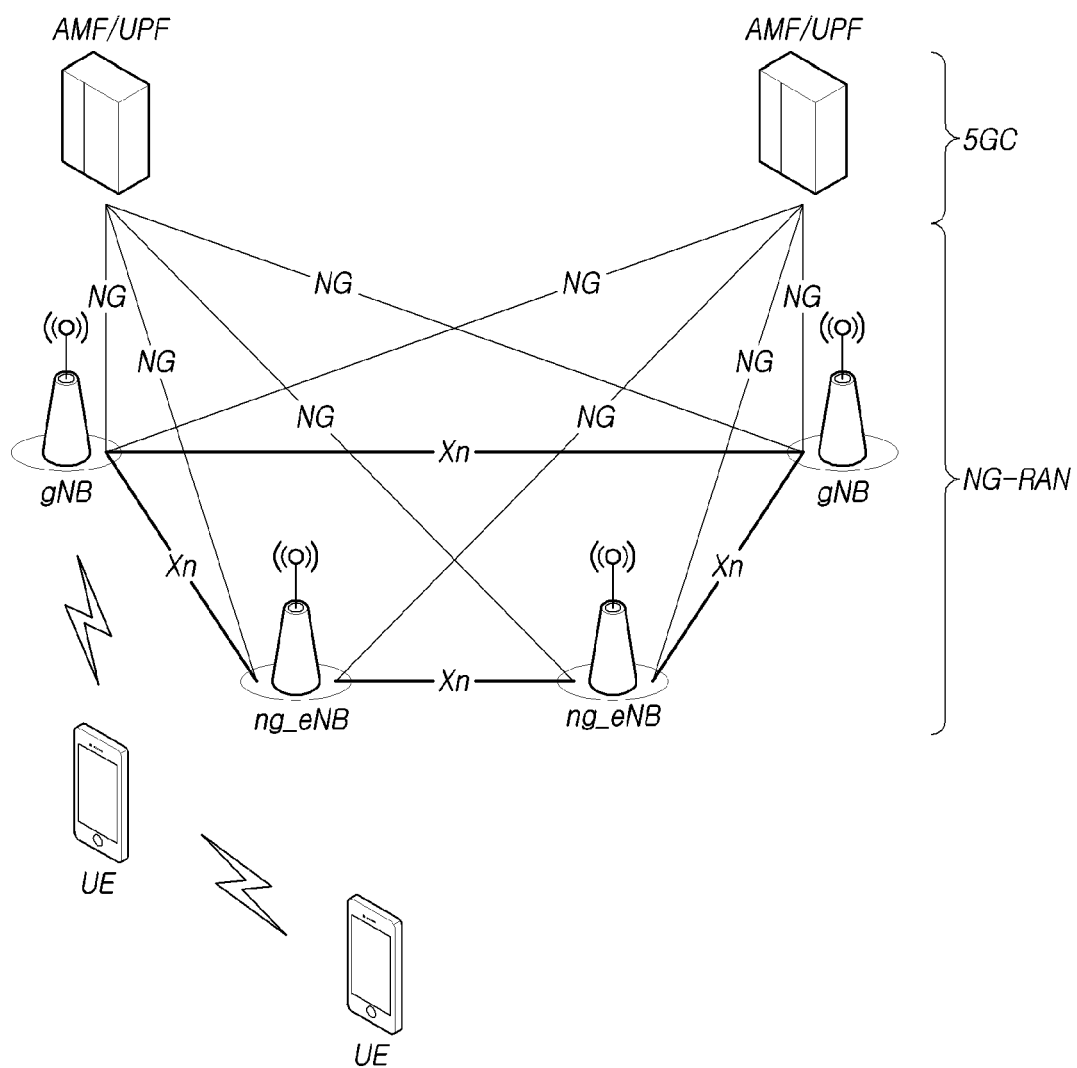
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as $3^{rd}$ generation partnership project (3GPP), 3GPP2, WiFi, Bluetooth, institute of electrical and electronics engineers (IEEE), international telecommunication union (ITU), or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Furthermore, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to data transmission and reception from a UE to a base station, and a downlink (DL) refers to data transmission and reception from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 schematically illustrates an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT)-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
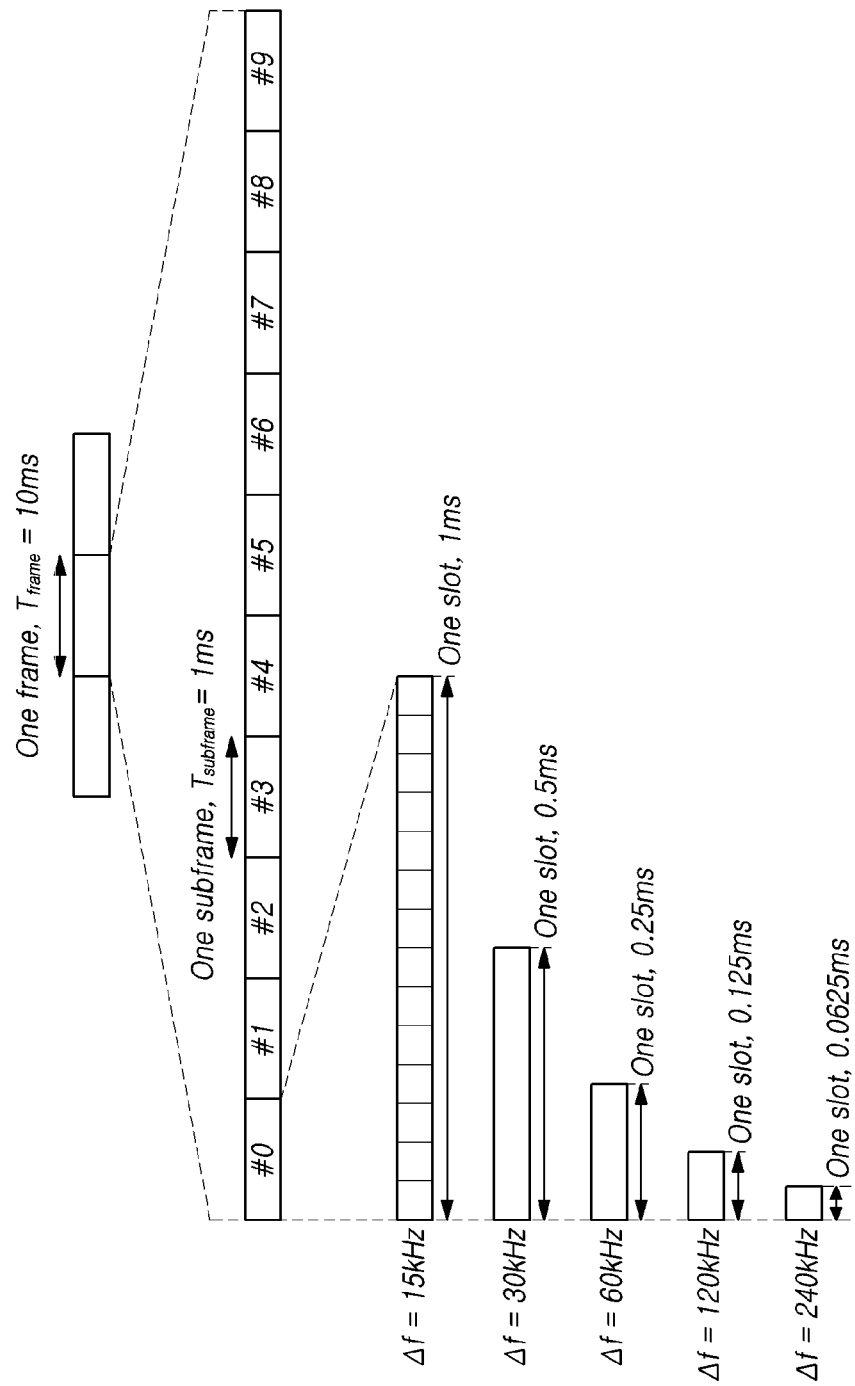
FIG. 2 schematically illustrates a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and has a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 illustrates a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically inform the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
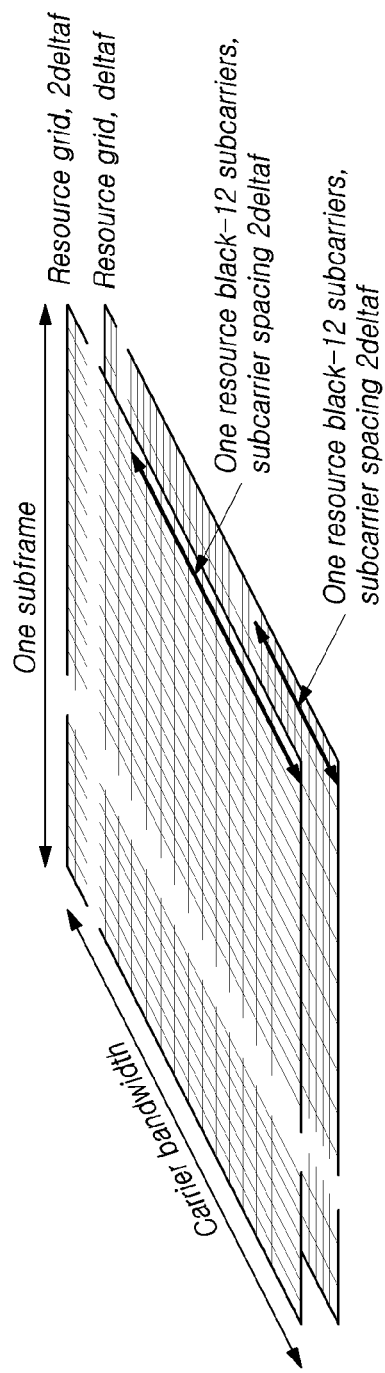
FIG. 3 illustrates resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
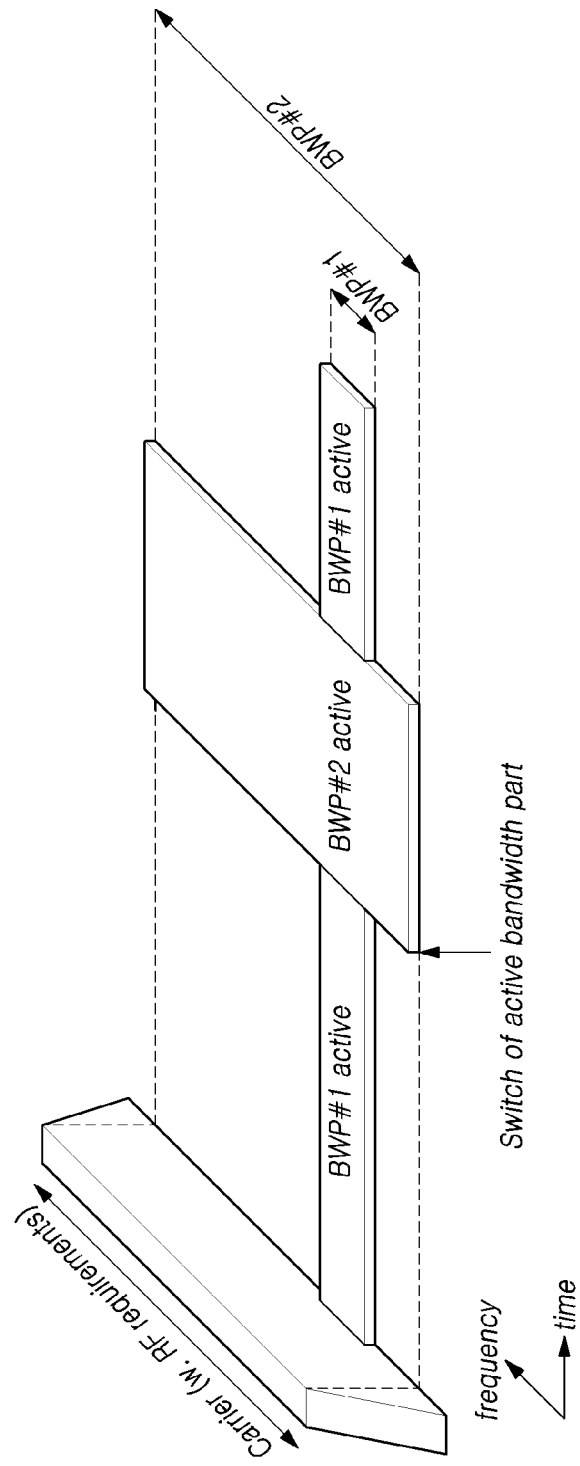
FIG. 4 illustrates bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
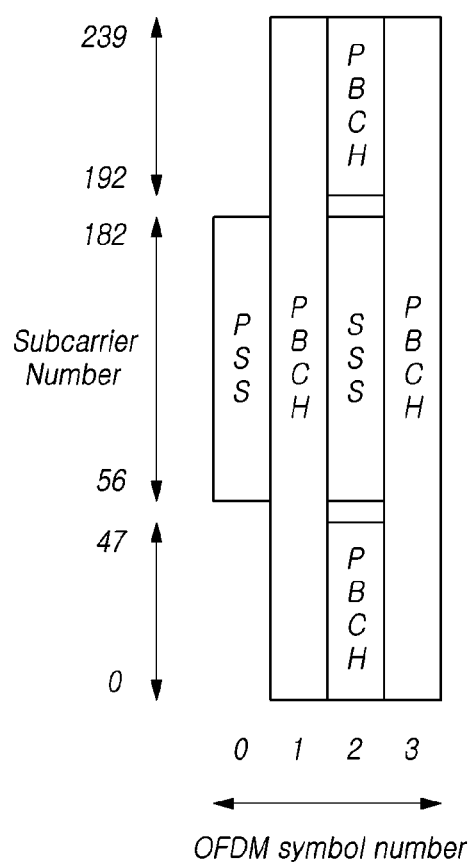
FIG. 5 illustrates an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
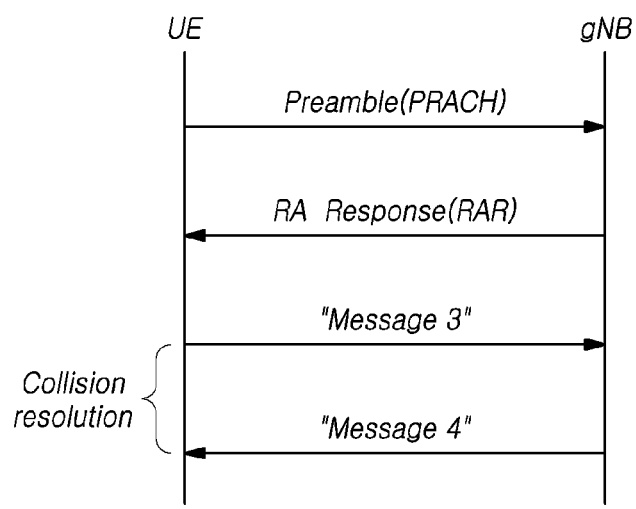
FIG. 6 is a signal diagram for explaining a random access procedure in a radio access technology in accordance with embodiments of the present disclosure.

FIG. 6 illustrates a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
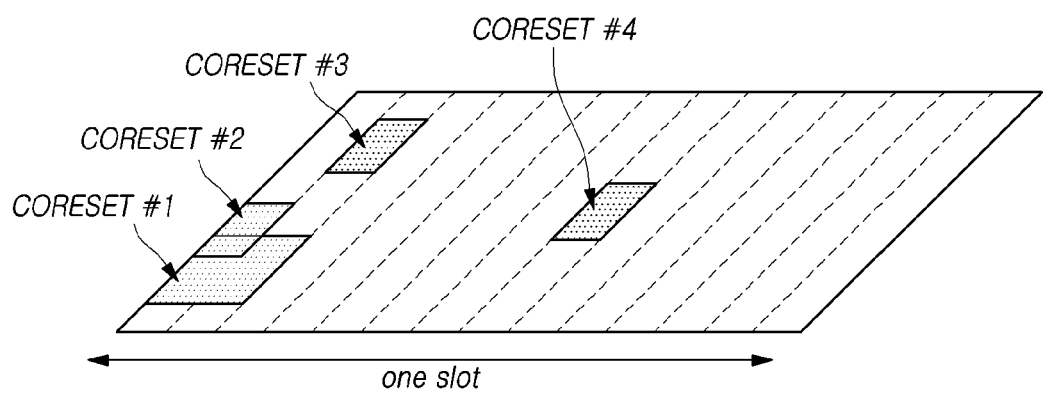
FIG. 7 illustrates CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<Lte Sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to assign a radio resource for the sidelink, two modes have been developed, i.e. i) mode 1 in which a base station assigns a radio resource and ii) mode 2 in which a UE selects and assigns a radio resource from a radio resource pool. Further, in order to satisfy the V2X scenario in the LTE system, a related technology has been required to be developed additionally.

In such an environment, the 3GPP have introduced 27 service scenarios related to vehicle recognition/detection in Rel-14, and determined key performance requirements according to road conditions. In addition, the 3GPP have introduced 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource assignment technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Assignment>

Figure 8:
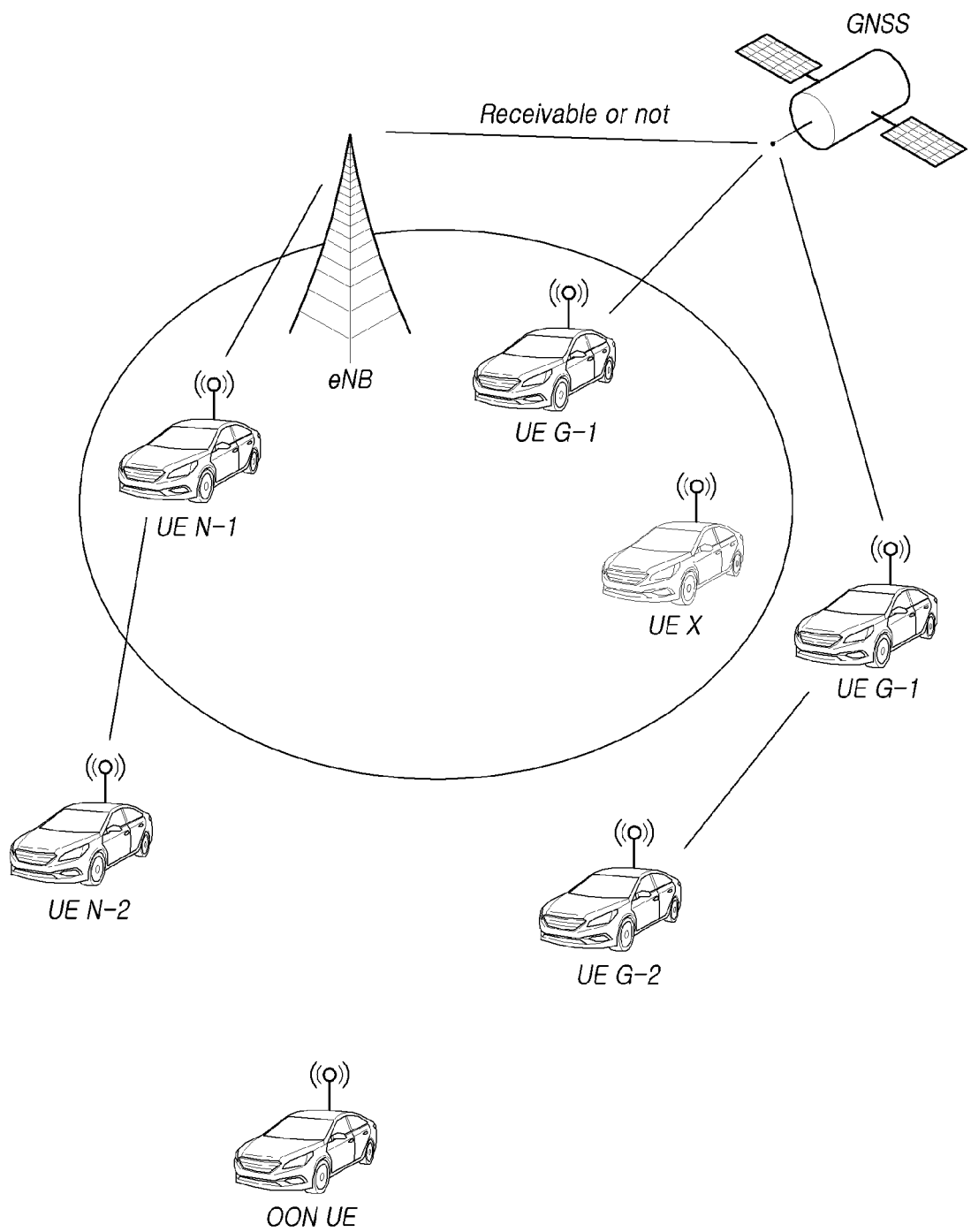
FIG. 8 illustrates various scenarios for V2X communication.

FIG. 8 illustrates various scenarios for V2X communication.

Referring to FIG. 8, a V2X device (represents a vehicle; however, may be replaced with other devices, such as a user equipment (UE), etc.) may be located in coverage of a base station (e.g., an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to assign a radio resource for enabling a corresponding UE to perform communication using the sidelink. The assignment of the radio resource includes a method of a base station for handling the assignment of the radio resource and a method of a UE on its own selects and assigns the radio resource.

Specifically, in the D2D, for enabling a UE to assign a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area assigned to this to a transmitter UE.

Figure 9A:
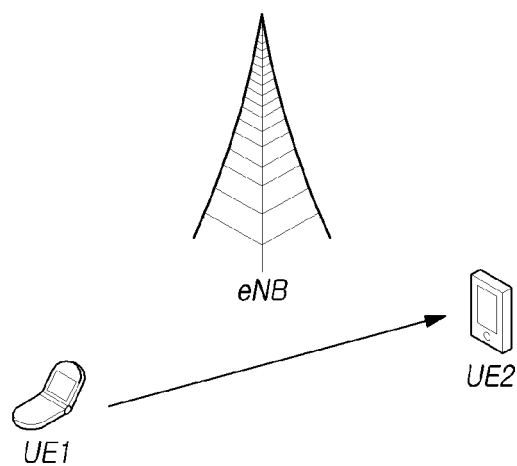
FIG. 9A illustrates a first user equipment (UE1) and a second user equipment (UE2) performing sidelink communication.
Figure 9B:
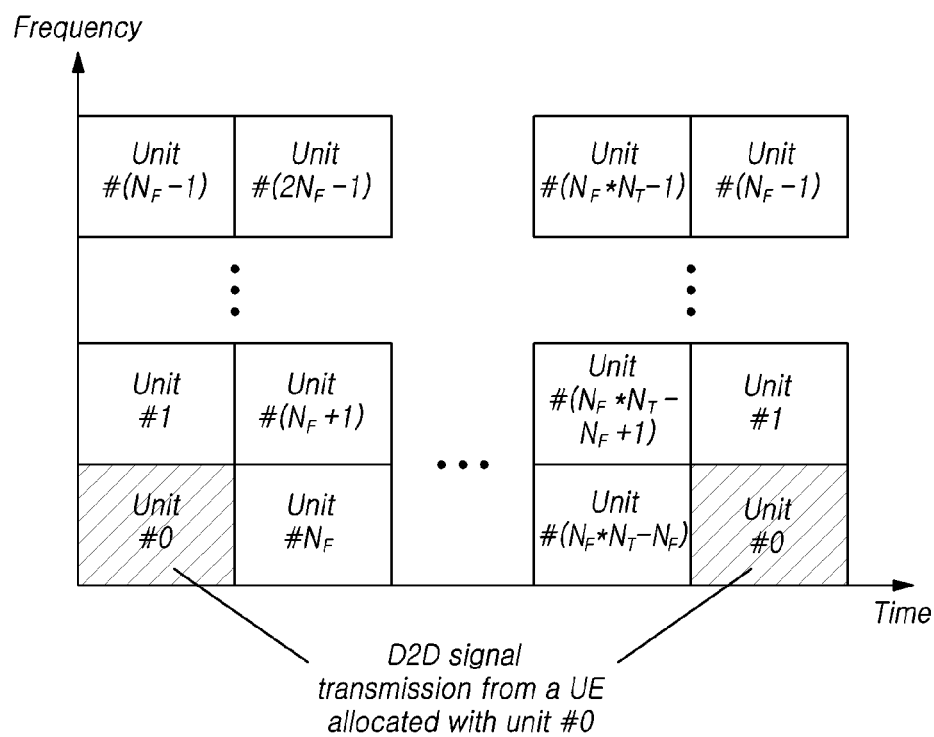
FIG. 9B illustrates an example of resource pools for user equipments.

FIG. 9A illustrates a first user equipment (UE1) and a second user equipment (UE2) performing sidelink communication, and FIG. 9B illustrates an example of resource pools used by the UEs.

Referring to FIG. 9, an eNB represents a base station; however, the embodiments are not limited thereto. For example, the base station may be a gNB or an ng-eNB. Further, the UEs represents mobile terminals; however, the embodiments are not limited thereto. For example, the UEs may represent vehicles, infrastructures, or the like depending on scenarios or situations.

In FIG. 9A, the transmitting UE (UE 1) may select a resource unit corresponding to a specific resource within a resource pool including a set of resources, and transmit a sidelink signal using the resource unit. The receiving UE (UE 2) may be configured with a resource pool over which the UE 1 is allowed to transmit a signal, and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units may be defined. In this case, it is possible to express that a corresponding resource pool is repeated at a period of NT subframes. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitting UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may cause a time delay until a data resource is assigned after a SA resource has been assigned to be reduced. For example, it is possible to consider a non-adjacent scheme in which a control channel resource and a data channel resource are split in time domain in one subframe, an adjacent scheme in which a control channel and a data channel are consecutively assigned in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitting UE to transmit information, such as an ID of the transmitting UE, or the like, and a neighboring UE to discover the transmitting UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of assigning a resource (e.g., whether a base station dedicates a resource for transmitting a signal to a transmitter UE or whether a transmitter UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary for performing communication using the sidelink. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (e.g., the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS, or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<NR Sidelink>

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
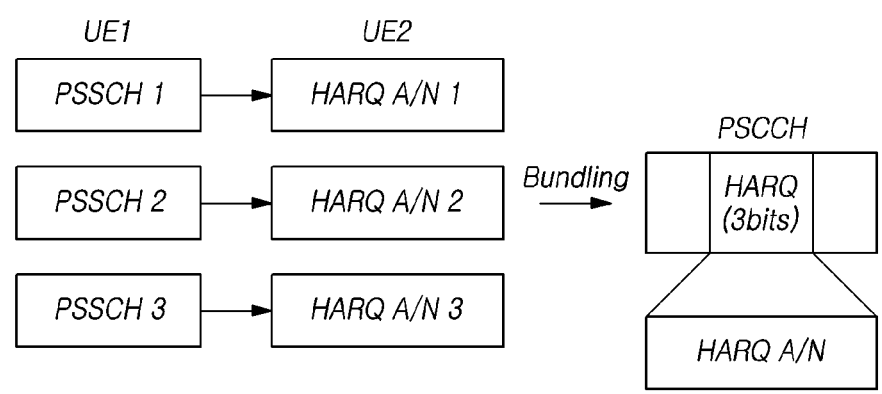
FIG. 10 illustrates a method of bundling and transmitting HARQ feedback information in the V2X.

FIG. 10 illustrates a method of bundling and transmitting HARQ feedback information in the V2X.

Referring to FIG. 10, in the LTE V2X, separate HARQ ACK/NACK information is not transmitted in order to reduce system overhead, and data are allowed to be retransmitted once according to discretion of a transmitting UE for data transmission safety. However, in the NR V2X, in terms of data transmission stability, HARQ ACK/NACK information may be transmitted. In this case, overhead may be reduced by bundling and transmitting the corresponding information.

That is, when a transmitting UE (UE1) transmits three data transmissions to a receiving UE UE2, and then the receiving UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

The following four options have been discussed for multiplexing of a PSCCH and an associated PSSCH, as illustrated in FIG. 11. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Assignment

At least two sidelink resource allocation modes, i.e. mode 3 and mode 4, may by defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource assignment sub-modes. That is, UE may automatically select a sidelink resource for transmission, help to select a sidelink resource for other UE(s), be configured with grant configured for sidelink transmission, or schedule the sidelink transmission of other UE(s).

V2X Resource Pool (Sensing and Selection Windows)

A V2X UE may transmit a message (or a channel) over a pre-defined (or signaled) resource pool. The resource pool may mean a set of one or more resources pre-defined for enabling the UE to perform the V2X operation (or in the UE capable of performing the V2X operation). In this case, the resource pool may be defined in terms of time-frequency. The V2X transmission resource pool may be defined as various types.

Figure 11A:
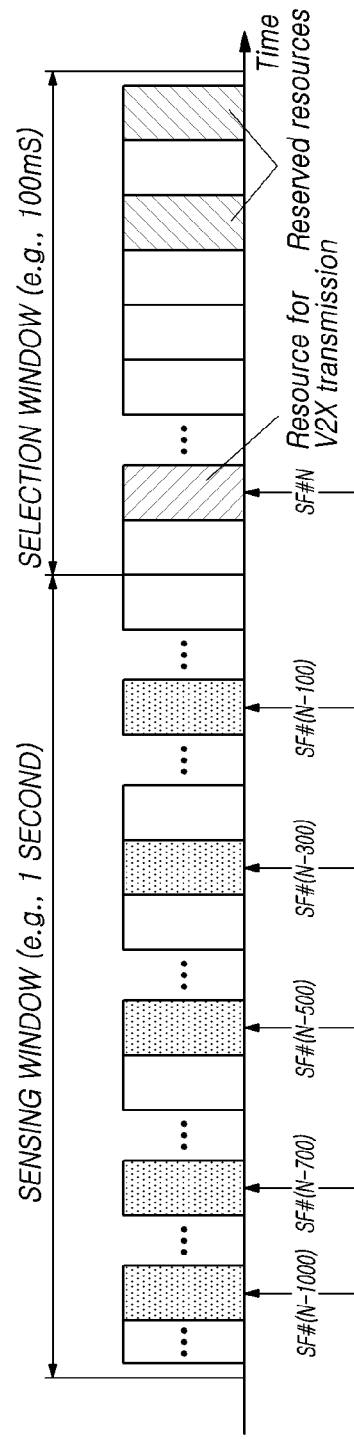
FIGS. 11A and 11B illustrate a type of a V2X transmission resource pool.
Figure 11B:
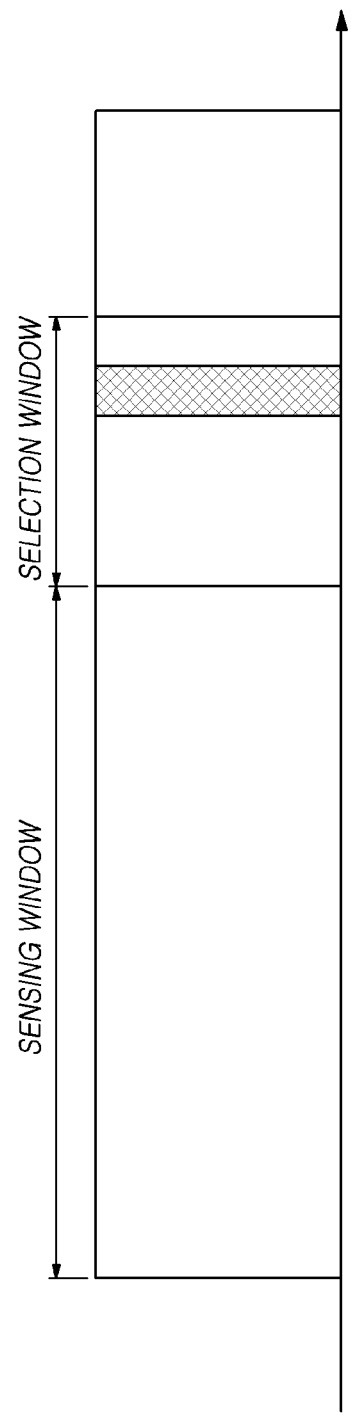

FIGS. 11A and 11B illustrate a type of a V2X transmission resource pool.

Referring to FIG. 11A, V2X transmission resource pool # A may be a resource pool over that allows partial sensing only. A V2X transmission resource selected by the partial sensing is remained semi-statically at a regular interval.

Referring to FIG. 11B, V2X transmission resource pool # A may be a resource pool allowing a random selection only. In V2X transmit resource pool # B, a UE does not perform partial sensing, and the UE may randomly select a V2X transmission resource in a selection window.

For example, unlike a resource pool allowing partial sensing only, in a resource pool allowing the random selection only, a selected resource may be configured/signaled not to be semi-statically reserved. In order for a UE to perform a V2X message transmission operation over a V2X transmission resource pool, a base station may cause the UE not to perform a sensing operation (based on scheduling assignment decoding/energy measurement).

Although not illustrated in FIGS. 11A and 11B, a resource pool allowing both the partial sensing and the random selection may be used as well. A base station may notify a UE that a V2X resource may be selected by either of the partial sensing and the random selection.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+an UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined. Thus the scheduling for the latency critical data, such as the URLLC, may be performed based on the mini-slot.

Figure 12:
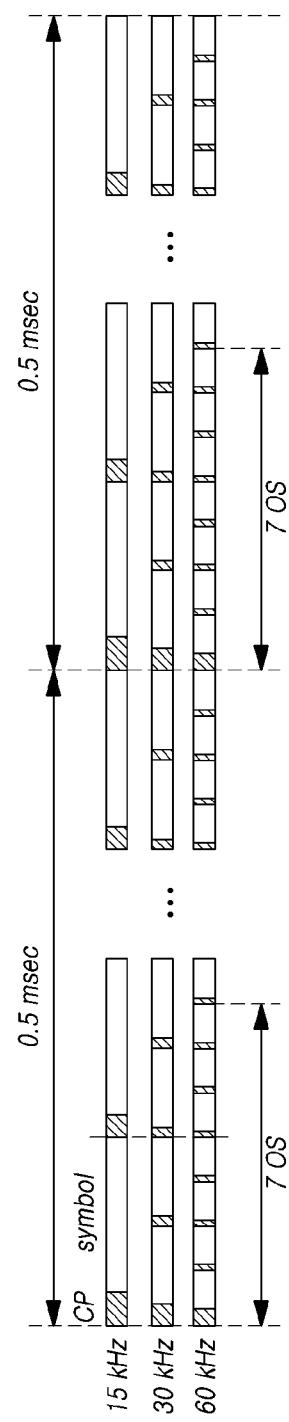
FIG. 12 illustrates an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
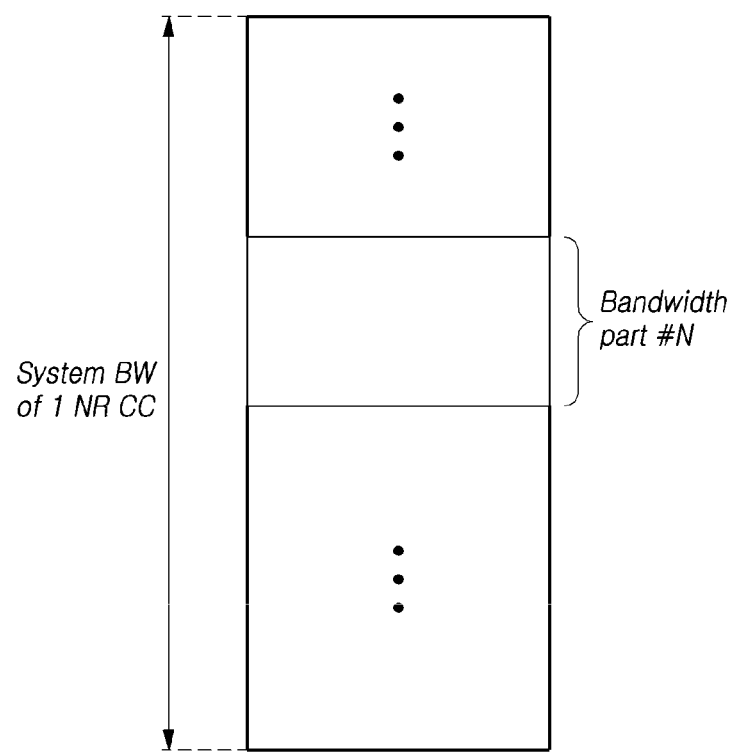
FIG. 13 schematically illustrates a bandwidth part.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 13, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

A Method of Assigning a HAM) ACK/NACK Feedback Resource

According to a PUCCH resource assignment method for HARQ ACK/NACK feedback of a UE, which is defined in the NR, a base station configures a PUCCH resource set including one or more PUCCH resources for a UE and indicates (e.g., inform) PUCCH resource information to be used for HARQ ACK/NACK feedback in response to a PDSCH transmission using an ACK resource indicator (ARI) information area of the DCI. In this case, the PUCCH resource set is configured for each UL BWP configured for a corresponding UE, and separate PUCCH resource set(s) may be configured depending on a payload size of HARQ ACK/NACK for a UL BWP.

Meanwhile, in the 3GPP LTE, a sidelink transmission/reception method is standardized, as an additional feature, for supporting vehicle-to-everything (V2X) communication including device-to-device (D2D) communication, vehicle-to-vehicle (V2V) communication, which is an extension of the D2D communication, and vehicle-to-infrastructure (V2I) communication. More specifically, the D2D is a service scenario that assumes typical communication between UEs having equal relationship to each other, and the V2V is an extended device-to-device communication service scenario that assumes a wireless communication environment between vehicle terminals having different characteristics from pedestrians. In order successfully to use radio resources with or without the assistance of a base station, various technologies have been standardized in initial access and resource allocation.

In the NR, there are studies in progress for V2X related standardization for supporting the sidelink and satisfying changed service requirements, and the following four new service scenarios are assumed.

Vehicles Platooning enables vehicles to dynamically form platoons that move together. All vehicles included in a platoon acquire information from a leading vehicle to manage the platoon. This information enables vehicles i) to drive with more being adjacent to one another in a coordinated manner compared to a normal situation and ii) to move in the same direction together.

Extended Sensors enable raw or processed data collected via local sensors or live video images to be exchanged between vehicles, road site devices, pedestrian devices and V2X application servers. As a result, vehicles are able to raise environmental awareness beyond what their sensors can detect and have a broader and holistic view for a corresponding local situation. The high rate of data transmission is one of main features of this service scenario.

Advanced Driving enables semi-automatic or fully automatic driving. This service scenario enables each vehicle and/or roadside unit (RSU) to share its own perception data obtained from local sensors with nearby vehicles and vehicles to synchronize and adjust trajectories or maneuvers. Each vehicle shares a driving intention with nearby driving vehicles.

Remote Driving enables a remote driver or a V2X application to drive i) a vehicle in a hazardous environment or ii) a remote vehicle for passengers which cannot drive on its own. For example, driving based on cloud computing may be used when variations are limited and routes are predictable as in the public transportation. High reliability and low latency are main requirements of this scenario.

Meanwhile, in the NR V2X, an agreement has been tentatively reached on supporting Mode 1 in which a base station manages communication resources between UEs and Mode 2 in which communication resources are managed by communication between UEs. In particular, in Mode 2, an agreement has been reached on the following four transmission types, and respective types have been represented as Mode 2-(a)~Mode 2-(d) or Mode 2a~Mode 2d.

Mode-2a: A UE autonomously selects sidelink resource for transmission.

Mode-2b: The UE assists sidelink resource selection for other UE(s).

Mode-2c: The UE is configured with NR configured grant (type-1 like) for sidelink transmission.

Mode-2d: The UE schedules sidelink transmissions of other UEs.

However, an agreement has been reached that the Mode-2b for transmitting subsequent channel configuration assistant information is defined as additional functions of the other three modes, and therefore, it will not be operated any longer as a single mode.

In the case of the LTE, a mode in which a base station manages communication resources between UEs is classified into Mode 1 and Mode 3, and a mode in which a UE manages communication resources at its discretion is classified into Mode 2 and Mode 4. A sidelink transmission procedure according to LTE Mode 1 is as follows.

1) A base station configures a resource pool for the transmission of a physical sidelink control channel (PSCCH) for all UEs. The resource pool is divided based on a unit of a region formed of two subframes and a bandwidth of 1RB (1×4=4 RBs in total), and then an index formed of 6 bits is allocated to each region. At this time, the index is allocated to only the upper half band of the resource pool, and all sidelink UEs repeatedly transmit identical sidelink control information (SCI) on an identical location of the lower half band thereof (8 RBs in total).

2) When a UE transmits a scheduling request (SR) to a base station over a physical uplink control channel (PUCCH), the base station transmits a PSCCH index of 6 bits and time/frequency resource information of the data region using downlink control information (DCI) Format 5 over a physical downlink control channel (PDCCH).

3) The UE transmits an SCI format 0 message through a PSCCH resource indicated by the 6 bits based on the received information. At this time, information received through the DCI Format 5 is used for the data region resource in the message. The UE encodes data to be sent using an MCS value that is pre-configured through RRC or selected by the UE itself, maps the encoded data to the corresponding data region resource, and then transmits the mapped data.

4) Other UEs continue to search the inside of the resource pool for PSCCH transmission When a desired PSCCH transmitted from a user is detected, the other UEs perform sidelink reception by detecting a data region resource location, an MCS, or the like based on a corresponding SCI message.

A sidelink transmission procedure according to LTE Mode 2 is as follows.

1) A base station configures a resource pool for PSCCH transmission in Mode 2 for all UEs. A structure of the corresponding pool is identical to that configured in Mode 1.

2) A UE checks whether a specific PSCCH resource region is used through sensing, and when the specific PSCCH resource region is empty, through the sensing, transmits an SCI format 0 message indicating the empty PSCCH resource region. At this time, the data region resource inside of the message is configured as a resource region configured at its own discretion. Further, the UE encodes data to be sent using an MCS value that is selected by the UE itself, maps the encoded data to the corresponding data region resource, and then transmits the mapped data.

3) A procedure of other UEs for performing corresponding region reception is identical to that of Mode 1.

A sidelink transmission procedure according to LTE Mode 3 is as follows.

1) A base station configures a resource pool for PSCCH transmission for all UEs. At this time, the corresponding PSCCH may be configured to be adjacent to a PSSCH indicated by the PSCCH or configured independently. In the case of being independently configured, the configuration of the resource pool for PSCCH transmission is similar to that of Mode 1. However, in this case, the corresponding resource pool is divided into regions of one subframe and two consecutive RBs (2×2=4 RBs in total), and an index formed of k bits is allocated to each region, wherein the k depends on a band size of the configured resource pool. When the PSCCH and the PSSCH indicated by the PSCCH are configured to be adjacent to each other, the band of the configured resource pool is divided, in the frequency domain, into sub-channels each having a size of at least 4 pre-configured RBs, and an index formed of k bits is allocated to the two lowest RBs of each sub-channel as a PSCCH transmission candidate region (2×2=4 RBs in total), wherein the k depends on the band of the configured resource pool, that is, the number of sub-channels. In the case of Mode 3, SCI is not transmitted repeatedly.

2) When a UE transmits a scheduling request (SR) to a base station over a PUCCH, the base station transmits a PSCCH index of k bits and time/frequency resource information of the data region using DCI Format 5 over a PDCCH.

3) The UE transmits an SCI format 1 message through a PSCCH resource indicated by the k bits based on the received information. At this time, information received by the DCI Format 5A is used for the data region resource in the message. Thereafter, the UE maps data to be sent to a corresponding data region resource and transmits the mapped data.

4) A subsequent procedure is identical to that in Mode 1.

A sidelink transmission procedure according to LTE Mode 4 has basically the same resource pool form as Mode 3, and a transmission scheme therein is the same as that in Mode 2. However, a message for reserving a resource by configuring a specific time-domain resource and a priority message for managing QoS are additionally included in SCI.

Meanwhile, in the case of NR-based V2X, there has arisen a necessity of supporting sidelink transmission/reception based on the unicast or the groupcast, as well as the broadcast. Like this, when it is desirable to define sidelink transmission and/or reception methods based on the unicast or the groupcast as one type of NR-based V2X communication, it is necessary to define a method of applying HARQ for a corresponding sidelink radio channel. A HARQ ACK/NACK message for a specific message may be transmitted over a pysical sidelink feedback channel (PSFCH). In this case, one or more last symbol(s) of a slot may be used on a location of the corresponding PSFCH.

Like this, when a PSFCH is allocated to the last symbol(s) of a slot, a UE using the corresponding slot for data transmission is required to perform transmission on other resource region(s) except for the resource region used for the PSFCH. However, in the current procedure, since only both a UE that has initially performed such PSFCH transmission and a UE that has received a corresponding block can recognize that such PSFCH transmission is performed, when one or more other UE(s) desire to use the corresponding resource region, a resource collision between the corresponding PSSCH region and the PSFCH region may occur.

In accordance with embodiments of the present disclosure, in the NR sidelink transmission/reception environment, a method is provided for allowing one or more other UE(s) to recognize a slot having a PSFCH region to be used by a UE. In particular, a method is provided of operating a resource pool in which a PSFCH region is pre-configured. Further, in such embodiment, when scheduling-based resource configuration is performed, a method is provided of dynamically transferring corresponding information through DCI/SCI.

Hereinafter, methods of transmitting and/or receiving HARQ feedback information for sidelink transmission will be described with reference to the accompanying drawings.

Herein, the term "transmitting UE (Tx UE)" means a UE transmitting a PSCCH and a PSSCH corresponding to the PSCCH based on sidelink communication. Further, the term "receiving UE (Rx UE)" means a UE receiving a PSCCH and a PSSCH corresponding to the PSCCH based on sidelink communication.

Figure 14:
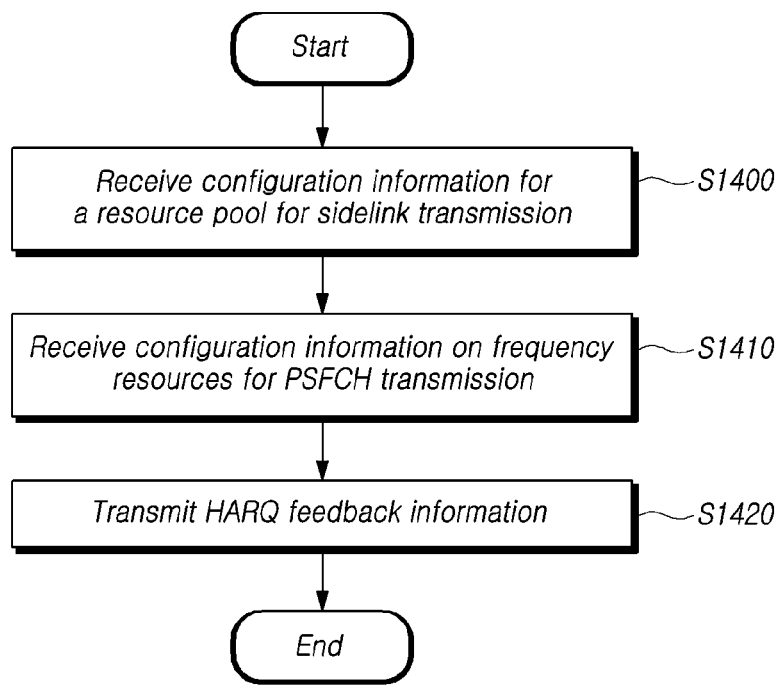
FIG. 14 is a flow diagram illustrating a procedure of a UE for transmitting HARQ feedback information in response to sidelink transmission in accordance with embodiments of the present disclosure.

FIG. 14 is a flow diagram illustrating a procedure of a UE for transmitting HARQ feedback information for sidelink transmission in accordance with embodiments of the present disclosure.

Referring to FIG. 14, a UE may receive configuration information for a resource pool for sidelink transmission from a base station, at step S1400.

The base station may configure a resource pool on radio resources for sidelink transmission and/or reception between the UE and one or more other UE(s). Here, the resource pool may be radio resources configured to be used for transmitting and/or receiving a PSCCH, a PSSCH, or the like between the UE and other UE(s). The UE may receive the configuration information for the resource pool from the base station through high layer signaling.

Hereinafter, embodiments will be described based on the Mode 2 in which a base station configures a resource pool for the sidelink and manage radio resources through communication between UEs; however, without departing from the spirit and the scope of the present disclosure, embodiments of the present disclosure may be substantially equally applicable to the Mode 1 in which a base station performs scheduling for sidelink transmission.

Referring back to FIG. 14, the UE may receive configuration information on frequency resources for transmission of a PSFCH in the resource pool, at step S1410.

When a PSSCH is received, the UE may be configured to transmit HARQ ACK/NACK feedback information corresponding to the received PSSCH to a UE that has transmitted the PSSCH. In order to use for the transmission of the HARQ ACK/NACK feedback information, the UE may receive the configuration information for the PSFCH resource.

In one embodiment, a PSFCH resource that is available to be used when the PSFCH is transmitted may be indicated in a resource pool for sidelink transmission which is configured between a UE and one or more other UE(s). In this case, a PSFCH region may be present in the resource pool in addition to a PSCCH region and a PSSCH region. In particular, the UE may receive, in the resource pool, configuration information for frequency resources for allowing a PSFCH to be transmitted.

In one embodiment, the frequency resources for the transmission of the PSFCH may be formed of a set of physical resource blocks (PRBs) in the resource pool for the sidelink transmission. In this case, configuration information for the frequency resources for the transmission of the PSFCH may be received by higher layer signaling.

Since the PSFCH is generally needed to correspond to one transport block, it is not necessary for a transmission region to be configured for each RB. That is, a PSFCH may be configured to be transmitted on only a location corresponding to one PSCCH transmission region when the PSFCH is initially transmitted, and a UE performing transmission using one or more remaining slot(s) having the corresponding region may perform the transmission by leaving the corresponding region empty. In this case, a symbol length of the PSFCH may be configured through RRC information in addition to a first resource configuration for a resource pool. Through this, a resource arrangement of the corresponding resource pool may be determined.

Referring back to FIG. 14, the UE may transmit HARQ feedback information in response to a PSSCH received from one or more other UE(s) using a PSFCH resource determined based on the configuration information for frequency resources in the resource pool, at step S1420.

When the PSSCH is received, the UE may configure the HARQ ACK/NACK feedback information corresponding to the received PSSCH. In one embodiment, whether HARQ feedback information is transmitted may be indicated by sidelink control information (SCI) including scheduling information for the PSSCH. That is, information for indicating the HARQ feedback information may be transmitted by being included in the SCI including resource allocation information for the PSSCH transmission.

Based on the number of sub-channels for a resource pool and the number of PSSCH slots associated with PSFCH slots, the UE may determine one or more PRBs for a PSFCH used for transmitting the HARQ feedback information among a set of PRBs according to configuration information for frequency resources in the resource pool. In addition to this, the UE may determine the number of PSFCH resources used for transmitting the HARQ feedback information.

Further, the transmission of the HARQ feedback information may be performed based on timing gap information, received by high layer signaling, between the reception of the PSSCH and the transmission of the HARQ feedback information in response to the reception of the PSSCH. In this case, in one embodiment, the transmission of the PSFCH may be performed in a first slot including a PSFCH resource in a resource pool after a last slot for the PSSCH reception.

That is, the UE may transmit HARQ ACK/NACK feedback information in response to the received PSSCH using the PSFCH resource determined from the resource pool.

As described, according to the method and apparatus in accordance with embodiments of the present disclosure, it is possible to configure PSFCH resources in a resource pool for sidelink transmission in order to transmit HARQ feedback information for the sidelink transmission, in the NR.

Figure 15:
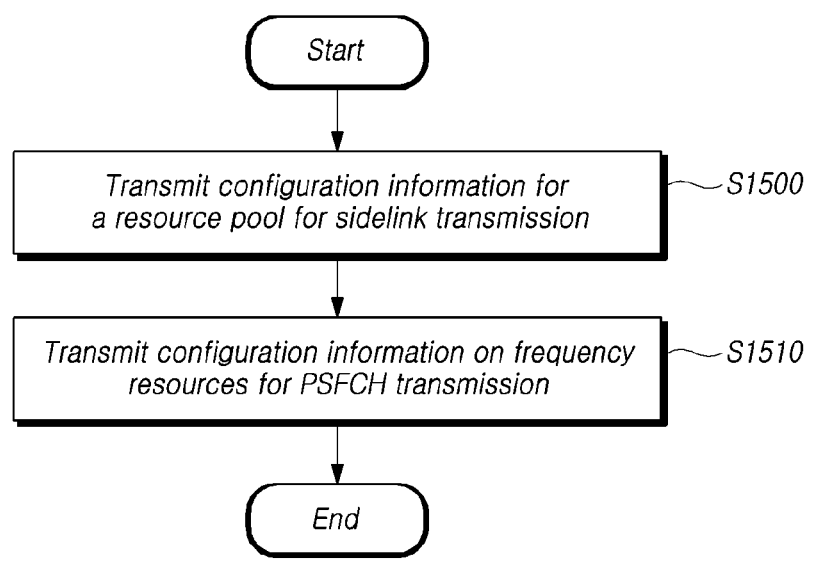
FIG. 15 is a flow diagram illustrating a procedure of a base station for controlling transmission of HARQ feedback information of a UE in response to sidelink transmission in accordance with embodiments of the present disclosure.

FIG. 15 is a flow diagram illustrating a procedure of a base station for controlling transmission of HARQ feedback information of a UE for sidelink transmission in accordance with embodiments of the present disclosure.

Referring to FIG. 15, a base station may transmit configuration information for a resource pool for sidelink transmission, at step S1500.

The base station may configure a resource pool on radio resources for sidelink transmission and/or reception between a UE and one or more other UE(s). Here, the resource pool may be radio resources configured to be used for transmitting and/or receiving a PSCCH, a PSSCH, or the like between the UE and other UE(s). The base station may transmit the configuration information for the resource pool to the UE through high layer signaling.

Referring back to FIG. 15, the base station may transmit configuration information on frequency resources for transmission of a PSFCH in the resource pool, at step S1510.

When a PSSCH is received, the UE may transmit HARQ ACK/NACK feedback information corresponding to the received PSSCH to a UE that has transmitted the PSSCH. In order to use for the transmission of the HARQ ACK/NACK feedback information, the base station may transmit the configuration information for the PSFCH resource to the UE.

In one embodiment, a PSFCH resource available when the PSFCH is transmitted may be indicated in a resource pool for sidelink transmission which is configured between a UE and other UE(s). In this case, a PSFCH region may be present in the resource pool in addition to a PSCCH region and a PSSCH region. In particular, the base station may transmit, in the resource pool, configuration information for frequency resources for allowing a PSFCH to be transmitted to the UE.

In one embodiment, the frequency resources for the transmission of the PSFCH may be formed of a set of PRBs in the resource pool for the sidelink transmission. In this case, configuration information for the frequency resources for the transmission of the PSFCH may be transmitted by higher layer signaling.

Since the PSFCH is generally needed to correspond to one transport block, it is not necessary for a transmission region to be configured for each RB. That is, a PSFCH may be configured to be transmitted on only a location corresponding to one PSCCH transmission region when the PSFCH is initially transmitted, and a UE performing transmission using one or more remaining slot(s) including the corresponding region may perform the transmission by leaving the corresponding region empty. In this case, a symbol length of the PSFCH may be configured through RRC information in addition to a first resource configuration for a resource pool. Through this, a resource arrangement of the corresponding resource pool may be determined.

The UE may transmit HARQ feedback information in response to a PSSCH received from other UE(s) using a PSFCH resource determined based on the configuration information for the frequency resources in the resource pool. When the PSSCH is received, the UE may configure the HARQ ACK/NACK feedback information corresponding to the received PSSCH. In one embodiment, whether HARQ feedback information is transmitted may be indicated by SCI including scheduling information for the PSSCH. That is, information for indicating the HARQ feedback information may be transmitted by being included in the SCI including resource allocation information for the PSSCH transmission.

Based on the number of sub-channels for a resource pool and the number of PSSCH slots associated with PSFCH slots, the UE may determine one or more PRBs for a PSFCH used for transmitting the HARQ feedback information among a set of PRBs according to configuration information for frequency resources in the resource pool. In addition to this, the UE may determine the number of PSFCH resources used for transmitting the HARQ feedback information.

Further, the transmission of the HARQ feedback information may be performed based on timing gap information, received by high layer signaling, between the reception of the PSSCH and the transmission of the HARQ feedback information in response to the reception of the PSSCH. In this case, in one embodiment, the transmission of the PSFCH may be performed in a first slot including a PSFCH resource in a resource pool after a last slot for the PSSCH reception.

That is, the UE may transmit HARQ ACK/NACK feedback information in response to the received PSSCH using the PSFCH resource determined from the resource pool.

As described above, according to the methods and apparatus in accordance with embodiments of the present disclosure, it is possible to configure PSFCH resources in a resource pool for sidelink transmission in order to transmit HARQ feedback information for the sidelink transmission, in the NR.

Hereinafter, embodiments related to radio resource configuration and allocation for transmitting HARQ feedback information for sidelink transmission in the NR will be described with reference to the accompanying drawings.

In accordance with embodiments of the present disclosure, in the NR sidelink transmission/reception environment, a method is provided for allowing other UE(s) to recognize a slot having a PSFCH region to be used by a UE. In particular, a method is provided for operating a resource pool having a pre-configured PSFCH region. Further, in such embodiment, when scheduling-based resource configuration is performed, a method is provided for dynamically transferring corresponding information through DCI/SCI.

In accordance with embodiments of the present disclosure, provided are (1) a method of operating a resource pool in which a PSFCH region is separately defined, and (2) a method of transferring information on whether a PSFCH region is present through a DCI/SCI region. The following terms are defined for describing operations in accordance with embodiments of the present disclosure. The terms used to describe embodiments of the present disclosure may be replaced by other terms having the same meaning in the future. Since it is intended to describe a function/feature/characteristic/operation/role of a corresponding configuration/object in actual operating, the scopes of embodiments of the present disclosure are not limited thereto.

Herein, the term "scheduling UE (S-UE)" means a UE performing a role of i) managing resources for sidelink transmission performed between UEs under its management, ii) allocating transmission resources for allocating to each link in time/frequency resources pre-configured by a base station, etc. based on a SR received from each UE or information received from a higher layer, and iii) transferring the allocated resource(s) to a transmitting UE related to a corresponding link.

Further, the term "scheduling indication message" means a message including time/frequency location information of a data region to be used by a transmitting UE, which is transferred by a base station or a scheduling UE in the form of DCI/SCI.

Further, the term "sidelink control message" means a message including time/frequency location and MCS information of a data region, which is transferred by a transmitting UE to a receiving UE.

Embodiment 1: Operating a Resource Pool in which a PSFCH Region is Separately Defined A PSFCH location may denote a location on which a PSFCH allocated to last symbols can be transmitted. Such a PSFCH location may be pre-defined in a resource pool. That is, in case the PSFCH location is defined in advance, a PSFCH region becomes also present in the resource pool, together with a PSCCH region and a PSSCH region. The PSFCH location may be collectively defined when a resource pool is configured through RRC, but may be additionally configured in a pre-dedicated resource pool through dedicated RRC. When needed, the PSFCH location be defined on at least two separate occasions. For example, a frequency location may be defined when a resource pool is configured, and the number of symbols may be configured through additional information. In another example, a PSFCH region may mean a region that will be activated among regions in locations defined for using when initially being configured, that is, a region which will be actually used as a PSFCH among regions on which a PSFCH can be configured. Such a PSFCH region may be additionally configured. Specifically, the following will be operated.

① Defining a Region on which a PSFCH can be Transmitted in a Resource Pool

Since the PSFCH is generally needed to correspond to one transmission block, it is not necessary for a transmission region to be configured for each RB. That is, a PSFCH may be configured to be transmitted on only a location corresponding to one PSCCH transmission region when the PSFCH is initially transmitted, and a UE performing transmission using one or more remaining slot(s) having the corresponding region may perform the transmission by leaving the corresponding region empty. In this case, a symbol length of the PSFCH may be configured through RRC information in addition to a first resource configuration for a resource pool. Through this, a resource arrangement of the corresponding resource pool may be determined.

Figure 16:
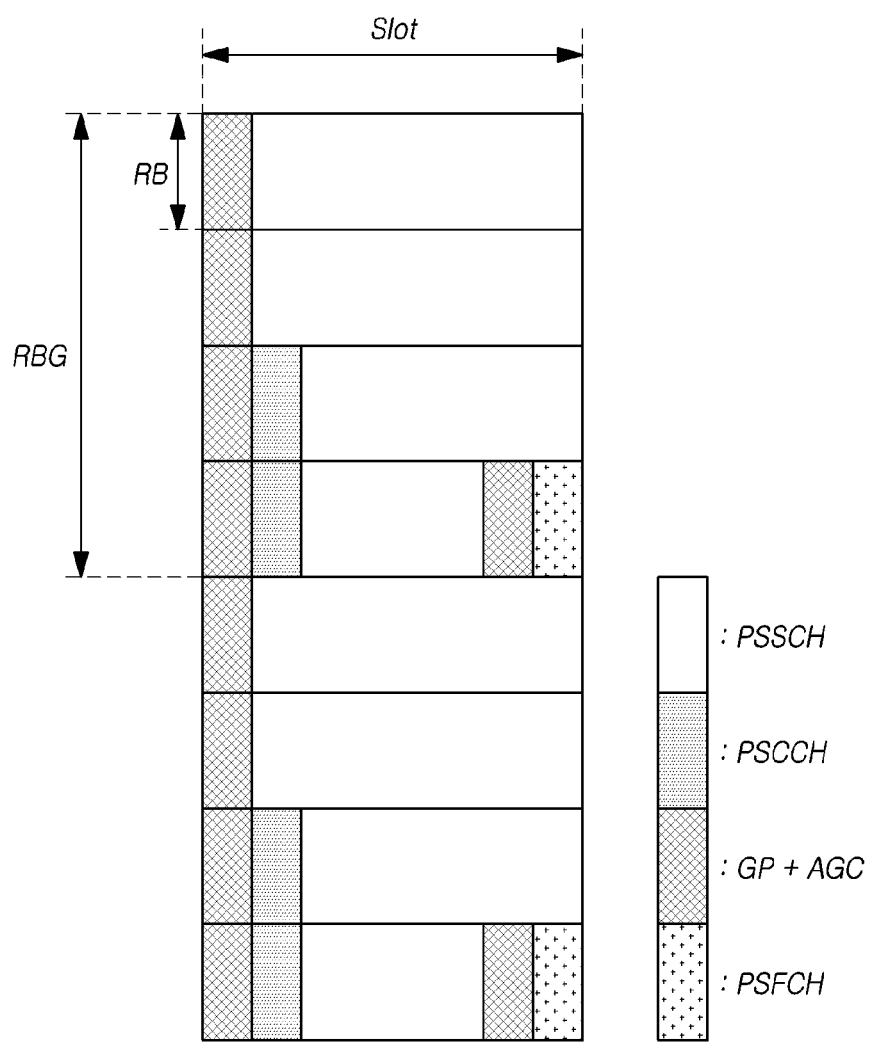
FIG. 16 illustrates an example of a PSFCH configured for each PSCCH configured on a resource block group (RBG) basis in a resource pool in accordance with embodiments of the present disclosure.

It is possible to leave the PSFCH configured in this manner empty through rate matching or puncturing. In this case, likewise, in case transmission is performed over a slot and RBs including the corresponding region through pre-configured information, the receiving end may determine that information has not transmitted on a corresponding PSFCH region and then perform reception and decoding. This type of example is illustrated in FIG. 16. The RBG in FIG. 16 does not mean 12 RBs typically defined in the NR, but means a minimum band over which one UE can transmit when a resource pool is configured. A band management structure inside of a resource pool illustrated in FIG. 16 is an example for convenience of description and ease of understanding; therefore, embodiments of the present disclosure are not limited thereto.

② Activating/Deactivating a Region on which a PSFCH can be Transmitted in a Pre-Dedicated Resource Pool Through RRC It is unnecessary to use the PSFCH for transmission blocks transmitted for broadcasting, etc., or in a situation where a HARQ procedure is configured not to be performed.

Accordingly, in case a configuration for a transmission scheme inside of one resource pool is semi-statically performed, a PSFCH may be configured to be present only in a part corresponding to a specific time/frequency resource. However, since such a situation is highly likely to change over time, only a PSFCH candidate region may be initially configured. Thereafter, a PSFCH region to be activated/deactivated may be indicated through additional RRC, or the like. Such a region may be transferred in the form of a PSFCH activation region, or be indirectly transferred in the form of a transmission region supporting HARQ.

Embodiment 2: Transferring Information on Whether a PSFCH Region is Present Through DCI and SCI Regions A PSFCH region configured and activated through RRC becomes a region that cannot be used by all UEs using a corresponding resource pool for PSSCH transmission. At this time, when the number of pre-configured PSFCH regions is small, it is impossible to utilize a sufficient quantity of PSFCHs, and when the number of pre-configured PSFCH regions is large, resources will be wasted. Accordingly, a method may be considered for excluding only a region actually allocated from transmission resources, by transferring information related to a region on which PSFCH transmission will be actually performed to a UE using a corresponding slot. Specifically, the following methods will be used.

① Transferring Information on an RB Location on which a PSFCH is Present and the Number of Symbols, when a Scheduler Indicates a Transmission Resource This is a method for allowing a transmitting UE to configure a transmission block except for the corresponding resource period by transferring information on a region for PSFCH transmission when informing of other UE a slot for performing corresponding transmission as a sidelink transmission period based on PSFCH usage information known to a base station or a scheduling UE. In case of the typical method, it may be implemented through start/end symbol location configuration; however, a corresponding symbol cannot be collectively used even when an RB on which a PSFCH is not used is present among allocated RBs. To address this issue, herein, the following methods are provided.

According to a method of 2-1-1, in case the number of symbols for PSFCH transmission is pre-configured as k, whether the last symbol of a corresponding transmission block becomes the end of a corresponding slot or the end of the slot-k can be indicated through 1-bit indication.

According to a method of 2-1-2, in case there is a PSFCH transmission resource pre-configured through the Embodiment 1, and the PSFCH transmission resource and an allocated PSSCH transmission resource overlap with each other, whether the corresponding transmission resource in a resource region is used for a PSSCH or is empty can be indicated through 1-bit indication. A base station may transfer whether a resource indication region includes a region used by one or more other UE(s) as a PSFCH usage. According to this, although the indication is simple, even when a part of PSFCH resources located in an overlapped region is used, it is necessary to empty all PSFCH resources for transmission.

According to a method of 2-1-3, in case k PSFCH transmission resource(s) pre-configured through the Embodiment 1 are included in a resource pool band, whether each PSFCH is used (a corresponding region is available) may be transferred using k-bit bitmap(s).

According to a method of 2-1-4, in case a long transmission block including k slots (where k is greater than 1) is configured, whether to empty the last transmission resource of any slot can be transferred using k-bit bitmap(s). For example, assumed is a case where the k is 3; according to this, a PSSCH is configured on $4^{th}$ to $42^{nd}$ symbols; the number of PSFCH transmission symbols is 3; and then, PSFCH transmission has occurred on a second slot. In this case, by transferring 010, a corresponding UE may configure only $4^{th}$ to $25^{th}$ and $29^{th}$ to $42^{nd}$ symbols as PSSCH transmission resources, or may not transmit (puncturing) data to be included on $26^{th}$ to $28^{th}$ symbols.

According to a method of 2-1-5, by combining the 2-1-3 and 2-1-4 methods, in case k pre-configured PSFCH transmission resources are present in a resource pool band and a long transmission block (Long TB) including n slots (where n is greater than 1) is configured, whether to empty the last transmission resource of any slot can be transferred using kn-bit bitmap(s).

According to a method of 2-1-6, as a scheduler transfers to a transmitting UE, even when configuring SCI actually to be transmitted by the transmitting UE to a receiving UE, by transferring PSFCH location information using the 2-1-1 to 2-1-4 methods, the receiving UE can successfully identify the transmission region.

② Using a Group Common Control Message

This is a method for allowing a scheduler to group-cast, to all UEs, which PSFCH is allocated or used in a specific sidelink resource pool using sidelink communication for each slot or for each period in which a PSFCH is configured. Through this, a transmitting UE may configure a transmission region except for a PSFCH region that is used based on information acquired through a corresponding group common control message and a received scheduling indication message. In this case, a receiving UE may re-configure a transmission region required to be received based on SCI and the corresponding group common control message. A DCI/SCI format capable of transferring this may be defined, and a length of a corresponding message may be depending on the number of PSFCHs in a resource pool.

Further, a region indicated by the corresponding format may be identical to a slot over which the corresponding DCI is transmitted. In order for the transmitting end to utilize corresponding information, there may be a difference of a (DCI-SCI) gap+a. Here, the DCI-SCI gap means a slot distance between i) a control channel over which a DCI message or a SCI message through which a scheduling user transfers a scheduling indication message is transmitted and ii) a PSCCH over which a transmitting UE transferred through this transmits corresponding SCI. The DCI-SCI may be fixed by a standard or may be set commonly for UEs. The a may be a value defined by a standard or may not be needed in general.

According to a method of 2-2-1, a corresponding group common control message is a control message transmitted in a semi-persistant manner. Therefore, the corresponding group common control message may be transmitted through a CORESET separately defined to reduce the probability of blind decoding (BD) of UEs.

The Embodiments 1 and 2 and their respective implementing methods may be applicable independently of or in combination with one another, in default or always, unless specifically specified.

Through methods provided herein, it is possible effectively to operate PSFCH transmission resources without deteriorating the performance of sidelink transmission of other users through PSFCH transmission.

Hereinafter, hardware configurations of a UE and a base station capable of performing a part or all of the embodiments described with reference to FIGS. 1 to 16 will be discussed with reference to the drawings.

Figure 17:
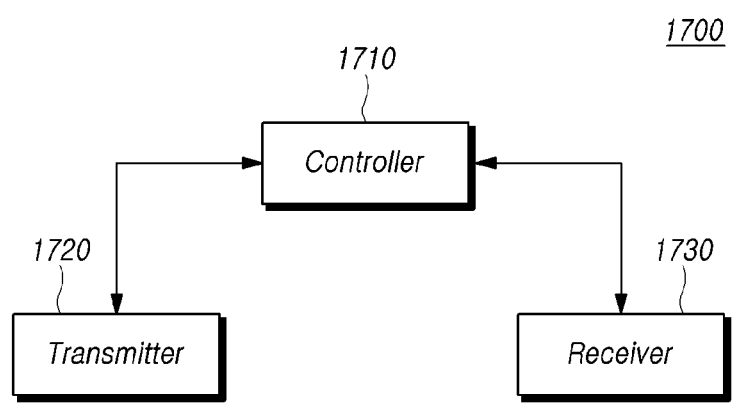
FIG. 17 is a block diagram illustrating a UE in accordance with embodiments of the present disclosure.

FIG. 17 is a block diagram illustrating a UE 1700 in accordance with embodiments of the present disclosure.

Referring to FIG. 17, the UE 1700 includes a controller (e.g., processing circuit) 1710, a transmitter (e.g., transmitting circuit, transmitter circuit) 1720, and a receiver (e.g., receiving circuit, receiver circuit) 1730.

The controller 1710 controls overall operations of the UE 1700 according to methods for allowing the UE to transmit HARQ feedback information for sidelink transmission to a base station, needed to perform the embodiments of the present described above. The transmitter 1720 transmits UL control information, data, and messages etc. to the base station over a corresponding channel, and transmits sidelink control information, data, and messages etc. to one or more other UE(s) over a corresponding channel. The receiver 1730 receives DL control information, data, and messages etc. from the base station over a corresponding channel, and receives sidelink control information, data, and messages etc. from other UE(s) over a corresponding channel.

The receiver 1730 may receive configuration information for a resource pool for sidelink transmission from the base station. The base station may configure a resource pool on radio resources for sidelink transmission and/or reception between the UE and other UE(s). Here, the resource pool may be radio resources configured to be used for transmitting and/or receiving a PSCCH, a PSSCH, or the like between the UE and other UE(s).

The receiver 1730 may receive configuration information on frequency resources for transmission of a PSFCH in the resource pool. When a PSSCH is received in the receiver 1730, the transmitter 1720 may transmit HARQ ACK/NACK feedback information corresponding to the received PSSCH to a UE that has transmitted the PSSCH. In order to use for the transmission of the HARQ ACK/NACK feedback information, the receiver 1730 may receive the configuration information on the PSFCH resource.

In one embodiment, a PSFCH resource for transmitting the PSFCH may be indicated in a resource pool for sidelink transmission which is configured between the UE and other UE(s). In this case, a PSFCH region may be present in the resource pool in addition to a PSCCH region and a PSSCH region. In particular, the receiver 1730 may receive, in the resource pool, configuration information for frequency resources for allowing a PSFCH to be transmitted.

In one embodiment, the frequency resources for the transmission of the PSFCH may be formed of a set of physical resource blocks (PRBs) in the resource pool for the sidelink transmission. In this case, the receiver 1730 may receive configuration information for the frequency resources for the transmission of the PSFCH through higher layer signaling.

Since the PSFCH is generally needed to correspond to one transport block, it is not necessary for a transmission region to be configured for each RB. That is, a PSFCH may be configured to be transmitted on only a location corresponding to one PSCCH transmission region when the PSFCH is initially transmitted, and a UE performing transmission using one or more remaining slot(s) in which the corresponding region is present may perform the transmission by leaving the corresponding region empty. In this case, a symbol length of the PSFCH may be configured through RRC information in addition to a first resource configuration for a resource pool. Through this, a resource arrangement of the corresponding resource pool may be determined.

The transmitter 1720 may transmit HARQ feedback information in response to a PSSCH received from other UE(s) using a PSFCH resource determined based on the configuration information for frequency resources in the resource pool.

When the PSSCH is received, the controller 1710 may configure the HARQ ACK/NACK feedback information corresponding to the received PSSCH. In one embodiment, whether HARQ feedback information is transmitted may be indicated by sidelink control information (SCI) including scheduling information for the PSSCH. That is, information for indicating the HARQ feedback information may be transmitted by being included in the SCI including resource allocation information for the PSSCH transmission.

Based on the number of sub-channels for a resource pool and the number of PSSCH slots associated with PSFCH slots, the controller 1710 may determine one or more PRBs for a PSFCH used for transmitting the HARQ feedback information among a set of PRBs according to configuration information for frequency resources in the resource pool. In addition to this, the controller 1710 may determine the number of PSFCH resources used for transmitting the HARQ feedback information.

Further, the transmission of the HARQ feedback information may be performed based on timing gap information, received by high layer signaling, between the reception of the PSSCH and the transmission of the HARQ feedback information in response to the reception of the PSSCH. In this case, in one embodiment, the transmission of the PSFCH may be performed in a first slot including a PSFCH resource in a resource pool after a last slot for the PSSCH reception.

That is, the transmitter 1720 may transmit HARQ ACK/NACK feedback information in response to the received PSSCH using the PSFCH resource determined from the resource pool.

As described, according to the UE 1700 in accordance with embodiments of the present disclosure, PSFCH resources may be configured in a resource pool for sidelink transmission in order to transmit HARQ feedback information for the sidelink transmission, in the NR.

Figure 18:
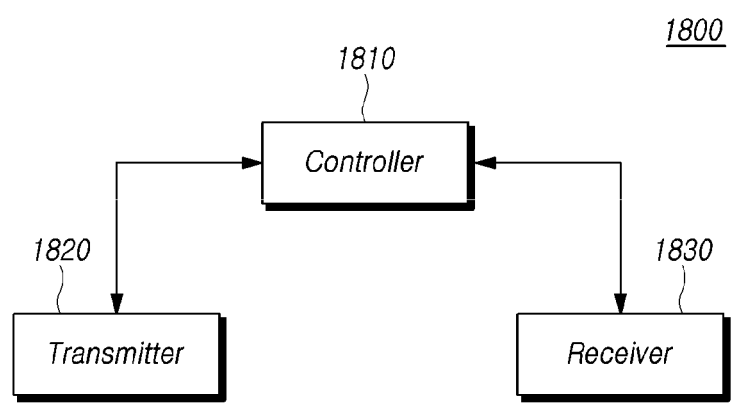
FIG. 18 is a block diagram illustrating a base station in accordance with embodiments of the present disclosure.

FIG. 18 is a block diagram illustrating a base station 1800 in accordance with embodiments of the present disclosure.

Referring to FIG. 18, the base station 1800 includes a controller (e.g., processing circuit) 1810, a transmitter (e.g., transmitting circuit, transmitter circuit) 1820, and a receiver (e.g., receiving circuit, receiver circuit) 1830.

The controller 1810 controls overall operations of the base station 1800 according to methods for allowing the base station 1800 to control HARQ feedback information of a UE for sidelink transmission, needed to perform the embodiments of the present disclosure described above. The transmitter 1820 transmits signals, messages, and data needed for carrying out the embodiments described above to a UE. The receiver 1830 receives signals, messages, and data needed for carrying out the embodiments described above from a UE.

The transmitter 1820 may transmit configuration information for a resource pool for sidelink transmission. The controller 1810 may configure a resource pool on radio resources for sidelink transmission and/or reception between a UE and other UE(s). Here, the resource pool may be radio resources configured to be used for transmitting and/or receiving a PSCCH, a PSSCH, or the like between the UE and other UE(s). The transmitter 1820 may transmit the configuration information for the resource pool to the UE through high layer signaling.

The transmitter 1820 may transmit configuration information on frequency resources for transmission of a PSFCH in the resource pool. When a PSSCH is received, the UE may be configured to transmit HARQ ACK/NACK feedback information corresponding to the received PSSCH to a UE that has transmitted the PSSCH. In order to use for the transmission of the HARQ ACK/NACK feedback information, the transmitter 1820 may transmit the configuration information for the PSFCH resource to the UE.

In one embodiment, a PSFCH resource for transmitting the PSFCH may be indicated in a resource pool for sidelink transmission which is configured between a UE and other UE(s). In this case, a PSFCH region may be present in the resource pool in addition to a PSCCH region and a PSSCH region. In particular, the transmitter 1820 may transmit, in the resource pool, configuration information for frequency resources for allowing a PSFCH to be transmitted to the UE.

In one embodiment, the frequency resources for the transmission of the PSFCH may be formed of a set of PRBs in the resource pool for the sidelink transmission. In this case, configuration information for the frequency resources for the transmission of the PSFCH may be transmitted by higher layer signaling.

Since the PSFCH is generally needed to correspond to one transport block, it is not necessary for a transmission region to be configured for each RB. That is, a PSFCH may be configured to be transmitted on only a location corresponding to one PSCCH transmission region when the PSFCH is initially transmitted, and a UE performing transmission using one or more remaining slot(s) having the corresponding region may perform the transmission by leaving the corresponding region empty. In this case, a symbol length of the PSFCH may be configured through RRC information in addition to a first resource configuration for a resource pool, and through this, a resource arrangement of the corresponding resource pool may be determined.

The UE may transmit HARQ feedback information in response to a PSSCH received from other UE(s) using a PSFCH resource determined based on the configuration information for frequency resources in the resource pool. When the PSSCH is received, the UE may configure the HARQ ACK/NACK feedback information corresponding to the received PSSCH. In one embodiment, whether HARQ feedback information is transmitted may be indicated by SCI including scheduling information for the PSSCH. That is, information for indicating the HARQ feedback information may be transmitted by being included in the SCI including resource allocation information for the PSSCH transmission.

Based on the number of sub-channels for a resource pool and the number of PSSCH slots associated with PSFCH slots, the UE may determine one or more PRBs for a PSFCH used for transmitting the HARQ feedback information among a set of PRBs according to configuration information for frequency resources in the resource pool. In addition to this, the UE may determine the number of PSFCH resources used for transmitting the HARQ feedback information.

Further, the transmission of the HARQ feedback information may be performed based on timing gap information, received by high layer signaling, between the reception of the PSSCH and the transmission of the HARQ feedback information in response to the reception of the PSSCH. In this case, in one embodiment, the transmission of the PSFCH may be performed in a first slot including a PSFCH resource in a resource pool after a last slot for the PSSCH reception.

That is, the UE may transmit HARQ ACK/NACK feedback information in response to the received PSSCH using the PSFCH resource determined from the resource pool.

As described, according to the base station in accordance with embodiments of the present disclosure, PSFCH resources may be configured in a resource pool for sidelink transmission in order to transmit HARQ feedback information for the sidelink transmission, in the NR.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method for transmitting hybrid automatic repeat request (HARQ) feedback information for sidelink transmission, the method comprising:
receiving first configuration information about a resource pool for the sidelink transmission;
receiving second configuration information about one or more resources for transmission of a physical sidelink feedback channel (PSFCH),
wherein the one or more resources for transmission of the PSFCH are configured within the resource pool for the sidelink transmission; and
transmitting HARQ feedback information in response to a physical sidelink shared channel (PSSCH) received from one or more other devices using a PSFCH resource,
wherein the PSFCH resource is determined based on the second configuration information about the one or more resources.

2. The method according to claim 1, wherein the one or more resources for the transmission of the PSFCH include a set of physical resource blocks (PRBs) in the resource pool for the sidelink transmission.

3. The method according to claim 1, wherein the second configuration information about the one or more resources for the transmission of the PSFCH is received by higher layer signaling.

4. The method according to claim 1, wherein the transmission of HARQ feedback information is indicated by sidelink control information (SCI) including scheduling information for the PSSCH.

5. The method according to claim 1, wherein the HARQ feedback information is transmitted based on timing gap information between the reception of the PSSCH and the transmission of the HARQ feedback information in response to the reception of the PSSCH, and
wherein the timing gap information is received by high layer signaling.

6. A base station for controlling transmission of hybrid automatic repeat request (HARQ) feedback information for sidelink transmission, the method comprising:
a transmitter;
a processor configured to control the transmitter thereby performing:
transmitting, to a first device, first configuration information about a resource pool for the sidelink transmission; and
transmitting, to the first device, second configuration information about one or more resources for transmission of a physical sidelink feedback channel (PSFCH),
wherein the one or more resources for transmission of the PSFCH are configured within the resource pool for the sidelink transmission,
wherein the second configuration is used for the first device to determine a PSFCH resource for transmitting HARQ feedback information in response to a physical sidelink shared channel (PSSCH) received from one or more other devices.

7. The base station according to claim 6, wherein the one or more resources for the transmission of the PSFCH include a set of physical resource blocks (PRBs) in the resource pool for the sidelink transmission.

8. The base station according to claim 6, wherein the second configuration information about the one or more resources for the transmission of the PSFCH is transmitted by higher layer signaling.

9. The base station according to claim 6, wherein the transmission of HARQ feedback information is indicated by sidelink control information (SCI) including scheduling information for the PSSCH.

10. The base station according to claim 6, wherein the HARQ feedback information is transmitted based on timing gap information between the reception of the PSSCH and the transmission of the HARQ feedback information in response to the reception of the PSSCH, and
wherein the timing gap information is received by high layer signaling.

11. A device for transmitting hybrid automatic repeat request (HARQ) feedback information for sidelink transmission, the device comprising:
a receiver configured to receive first configuration information about a resource pool for the sidelink transmission and receive second configuration information about one or more resources for transmission of a physical sidelink feedback channel (PSFCH),
wherein the one or more resources for transmission of the PSFCH are configured within the resource pool for the sidelink transmission; and
a transmitter configured to transmit the HARQ feedback information in response to a physical sidelink shared channel (PSSCH) received from one or more other devices through a PSFCH resource,
wherein the PSFCH resource is determined based on the second configuration information about the one or more resources.

12. The wireless device according to claim 11, wherein the one or more resources for the transmission of the PSFCH include a set of physical resource blocks (PRBs) in the resource pool for the sidelink transmission.

13. The wireless device according to claim 11, wherein the second configuration information about the one or more resources for the transmission of the PSFCH is received by higher layer signaling.

14. The wireless device according to claim 11, wherein the transmission of HARQ feedback information is indicated by sidelink control information (SCI) including scheduling information for the PSSCH.

15. The wireless device according to claim 11, wherein the HARQ feedback information is transmitted based on timing gap information between the reception of the PSSCH and the transmission of the HARQ feedback information in response to the reception of the PSSCH, and
wherein the timing gap information is received by high layer signaling.

* * * * *